United States Patent [19]

Knechtel

[11] Patent Number: 4,933,959
[45] Date of Patent: Jun. 12, 1990

[54] TRACKING BIT SYNCHRONIZER

[75] Inventor: John Kevin Knechtel, Azusa, Calif.

[73] Assignee: Datatape Incorporated, Pasedena, Calif.

[21] Appl. No.: 349,018

[22] Filed: May 8, 1989

[51] Int. Cl.⁵ .................................. H04L 7/033
[52] U.S. Cl. ................................ 375/120; 331/4
[58] Field of Search .............. 375/120, 119, 81; 331/1 A, 25, 17, 4

[56] References Cited

U.S. PATENT DOCUMENTS

| | | | |
|---|---|---|---|
| 4,151,485 | 4/1979 | LaFratta | 375/120 |
| 4,280,224 | 7/1981 | Chethik | 375/95 |
| 4,375,693 | 3/1983 | Kuhn | 375/120 |
| 4,375,694 | 3/1983 | Kuhn | 375/120 |
| 4,590,602 | 5/1986 | Wolaver | 375/120 |
| 4,752,748 | 6/1988 | Crzeszykowski | 331/1 A |
| 4,766,397 | 8/1988 | Adams | 331/1 A |
| 4,787,097 | 11/1988 | Rizzo | 375/120 |

*Primary Examiner*—Douglas W. Olms
*Assistant Examiner*—Marianne Huseman
*Attorney, Agent, or Firm*—William F. Noval

[57] ABSTRACT

Disclosed is a tracking bit synchronizer for use in digital data apparatus such as high density digital magnetic tape recorders. The disclosed bit synchronizer effects synchronization of data if the data rate is known within one octave. Moreover, data rates can change during operation over an octave range without bit errors or other loss of data. The bit synchronizer includes a phase locked loop which produces a clocking signal in synchronism with incoming encoded data. A data error detector uses information from a data decoder to determine if phase lock at the proper data rate has occurred. Control circuitry uses this information, along with the output voltage of the phase locked loop filter, to operate the phase locked loop in either a seek mode or a tracking mode. A squelch circuit prevents phase corrections during data signal dropouts.

3 Claims, 7 Drawing Sheets

TRACKING BIT SYNCHRONIZER

BACKGROUND OF THE INVENTION

This invention relates to a bit synchronizer for digital data and, more particularly, this invention relates to a tracking bit synchronizer for use in high density digital magnetic tape recorders.

Digital data transmitted over a data channel (such as a communication channel or a record/reproduce channel) is frequently transmitted without specific data rate information. Thus, unencoded digital data has data transitions which are unrelated to the data rate. Typically, a bit synchronizer includes a phase locked loop which serves as a clock regeneration circuit. This circuit allows recovery of data from a recording or transmission where the data is available without a corresponding clock signal. The regenerated clock defines the timing of the data and is used to detect, decode and process the data.

Figure 1:
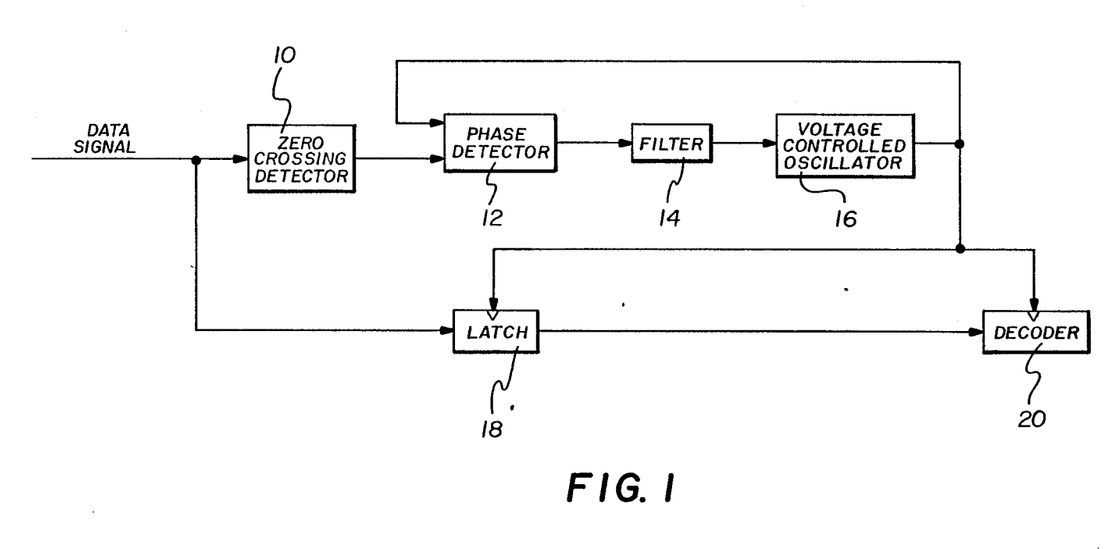
FIG. 1 is a block diagram of a known bit synchronizer using a phase locked loop.

A functional block diagram of a typical bit synchronizer is shown in FIG. 1. As shown, zero crossing detector 10 detects the zero crossings of an incoming data signal. Phase detector 12 compares the zero crossings of the incoming data signal to a clock signal produced by voltage control oscillator (VCO) 16. The result of this phase comparison is filtered by filter 14 and the filtered voltage is used to adjust VCO 16 to achieve frequency and phase lock with the incoming data signal. This clock signal is used to synchronize latch 18 and decoder 20. Such bit sychronizers require phase detectors which allow recovery of phase information from edges in the data, but, which do not give false phase information in the absence of data edges. This is needed since any consecutive 1's or consecutive 0's do not have an edge between them in data formats which are not self clocking. The phase detector of the bit synchronizer of FIG. 1 typically includes a mixer, exclusive or gates, or sequential logic circuits. A disadvantage of such phase detector circuits is that a clock edge without a corresponding data edge would cause them to indicate a phase error, which would send a false correction signal to VCO 16.

Bit synchronizer phase detectors typically include an early/late gate which only produces phase error information near a data transition (see, for example, U.S. Pat. 4,766,397, issued Aug. 23, 1988, Inventor Adams; and U.S. Pat. 4,280,224, issued Jul. 21, 1981, Inventor Chethik).

The ability of the early/late gate detector to tolerate missing data edges may also result in false bit synchronizer locks to occur at incorrect clock rates. Thus, for example, digital data encoded in a bi-phase mark encoding format produces two clocks for each data cell, such that there is a clock edge for each data edge, plus an additional edge at mid-bit time. Repeating data patterns will also be sensitive to false locks at other frequencies which are not necessarily at simple multiples of the correct data rate. Since the clock of a phase locked loop can lock to data at a number of clock rates, only one of which is correct, bit synchronizers (such as those disclosed in the latter two patents) have typically been constrained to operate in a small range (plus or minus 1 percent to plus or minus 4 percent) around the correct data rate. In operation, such bit synchronizers will be adjusted for frequency of operation at normal set up and alignment and at appropriate maintenance intervals. For many applications, the data rate is constant and this type of operation is adequate. However, such bit synchronizers are inadequate in appllcations where the signal sources vary data rate by design (such as downlooking radars) or where the incoming data signal varies in frequency due to doppler or other environmental effects. Moreover, due to time and temperature drifts, even the most stable of bit synchronizers will not be at optium adjustment all the time, thus, producing inaccurate clock signals.

U.S. Patent 4,375,693, issued Mar. 1, 1983, Inventor Kuhn, and, U.S. Pat. 4,375,694, Mar. 1, 1983, Inventor Kuhn, disclose a bit synchronizer capable of operation over broad range of frequencies by means of an auto range capability which automatically steps the frequency of the voltage controlled oscillator of a phase locked loop through half octaves within an arbitrarily large range. However, the bit synchronizer disclosed in these patents has a narrow lock range (1 percent) and, thus, is not suitable for applications where the ability to lock to a wide range of data rates without readjustment is desirable.

Thus, it is desirable that a bit synchronizer have the ability to lock to a wide range of data rates without readjustment. It is also desirable that the bit synchronizer be able to follow changing data rates and to compensate automatically for any temperature drifts and aging. The bit synchronizer should be immune to false phase locks.

SUMMARY OF THE INVENTION

According to the present invention, there is disclosed a bit synchronizer which obviates the disadvantages of the prior art. The bit synchronizer of the present invention has the ability to lock to a wide range of data rates without readjustment. Moreover, the bit synchronizer of the present invention (1) is able to follow changing data rates, (2) is able to compensate automatically for its own temperature drifts and aging, and (3) is substantially immune to false phase locks.

According to a feature of the present invention, the bit sychronizer is operable in a seek mode and a tracking mode. The bit synchronizer includes a phase locked loop having a voltage controlled oscillator which is swept over the frequency range of interest, while an incoming, encoded data signal is monitored by a data error detector for an indication of good data. The data error detector uses information from a decoder to determine if phase lock at the proper data rate has occurred. Control circuitry uses that information along with the output voltage from the filter of the phase locked loop to determine if searching for lock or adjusting to minimize loop stress is required. The control circuitry controls the center frequency of the voltage controlled oscillator of the phase locked loop. According to another feature of the present invention, a squelch circuit ensures that no phase corrections are made during signal dropouts.

DESCRIPTION OF THE DRAWINGS

In a detailed description of the preferred embodiments of the invention presented below, reference is made to the accompanying drawings in which like numerals refer to like elements.

DETAILED DESCRIPTION OF THE PREFERRED EMBODIMENT

Figure 2:
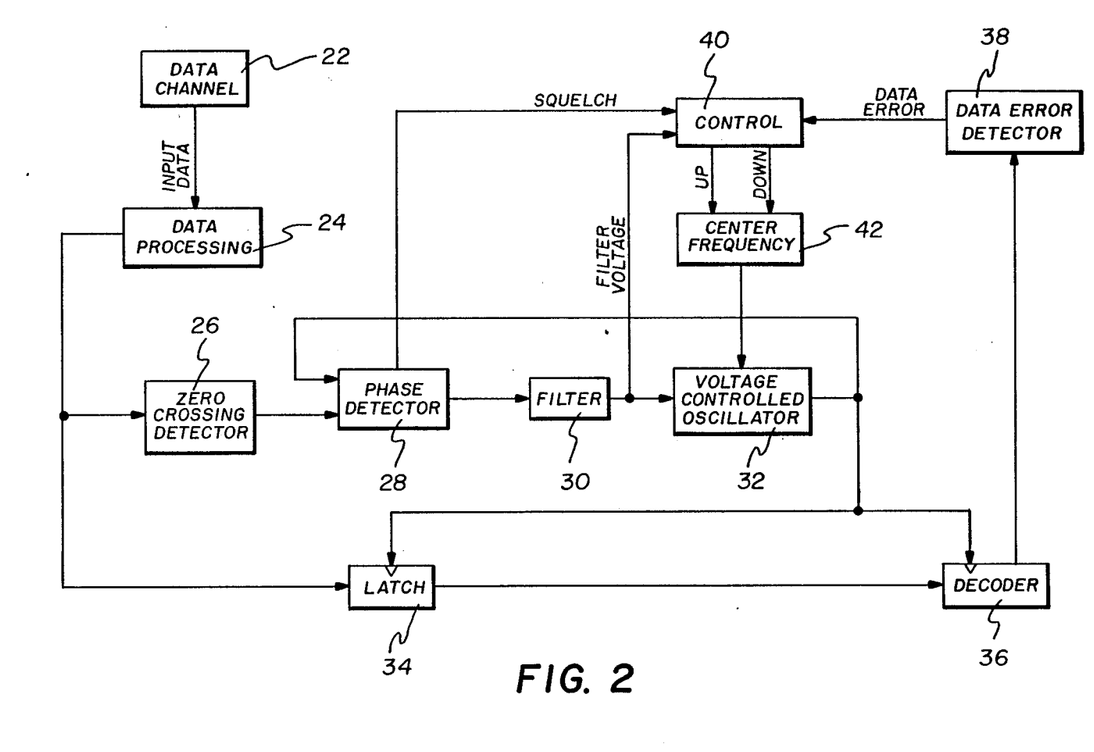
FIG. 2 is a block diagram of a bit synchronizer according to the present invention.

Referring now to FIG. 2, there is shown a preferred embodiment of a bit synchronizer according to the present invention. As shown, input data transmitted over a data channel 22 is received by data processing circuit 24. Data channel 22 may be a communication channel (satellite, microwave, optical fiber) or a record and/or reproduce channel (optical or magnetic media) which transmits digital data. The digital data transmitted is encoded in a code which permits a digital decoder to detect whether or not a good phase lock has been achieved during the decoding process. An example of such encoding format is the odd parity grouping that occurs in enhanced nonreturn to zero (ENRZ) or psuedo random odd parity (PROP) coding techniques. When using such codes, if the digital decoder, which decodes such encoded data, determines that even parity is found when odd parity is expected, a violation of the coding rules is detected and no phase lock is determined.

If the data channel 22 of FIG. 2 is assumed to be a magnetic tape recording/reproducing system, then data processing circuit 24 amplifies the received data signal and effects amplitude and phase equalization of the signal to produce a data signal which is a close replica of the transmitted signal (i.e. recorded signal).

The processed data is supplied to latch 34 and zero crossing detector 26. Phase detector 28 compares zero crossings of the incoming data signal from detector 26 with the phase of a clock signal produced by voltage controlled oscillator (VCO) 32. Filter 30 filters the phase error between the two signals and applies the filtered voltage to VCO 32 to adjust the frequency produced up or down to achieve frequency and phase lock with the incoming data signal. The incoming data signal is provided to decoder 36 by latch 34. Decoder 36 decodes the encoded signal. Data error detector 38 uses information form decoder 36 to determine whether or not phase lock at the proper frequency has occurred. Control circuit 40 receives a squelch signal from phase detector 28, the error voltage from filter 30, and data eror signals from detector 38, to adjust the center frequency of VCO 32 in up or down directions by means of center frequency circuit 42. Control circuit 40 uses the squelch signal to inhibit phase corrections during signal dropouts of the incoming data signal. Control circuit 40 uses the information from detector 38 and the error voltage from filter 30 to determine if searching for phase lock or adjusting to minimize loop stress is required.

Figure 3:
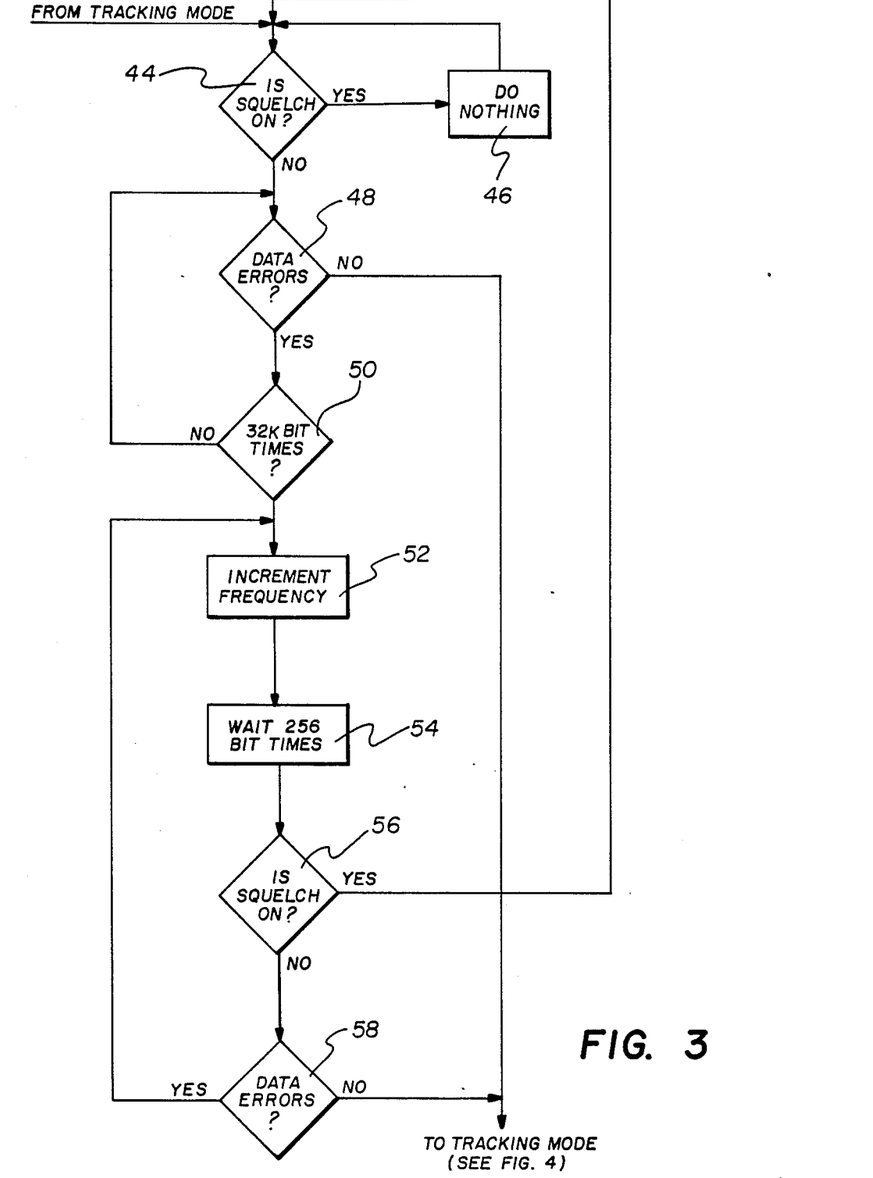
FIGS. 3 and 4 are flow diagrams illustrating operation of the embodiment of the invention shown in FIG. 2.
Figure 4:
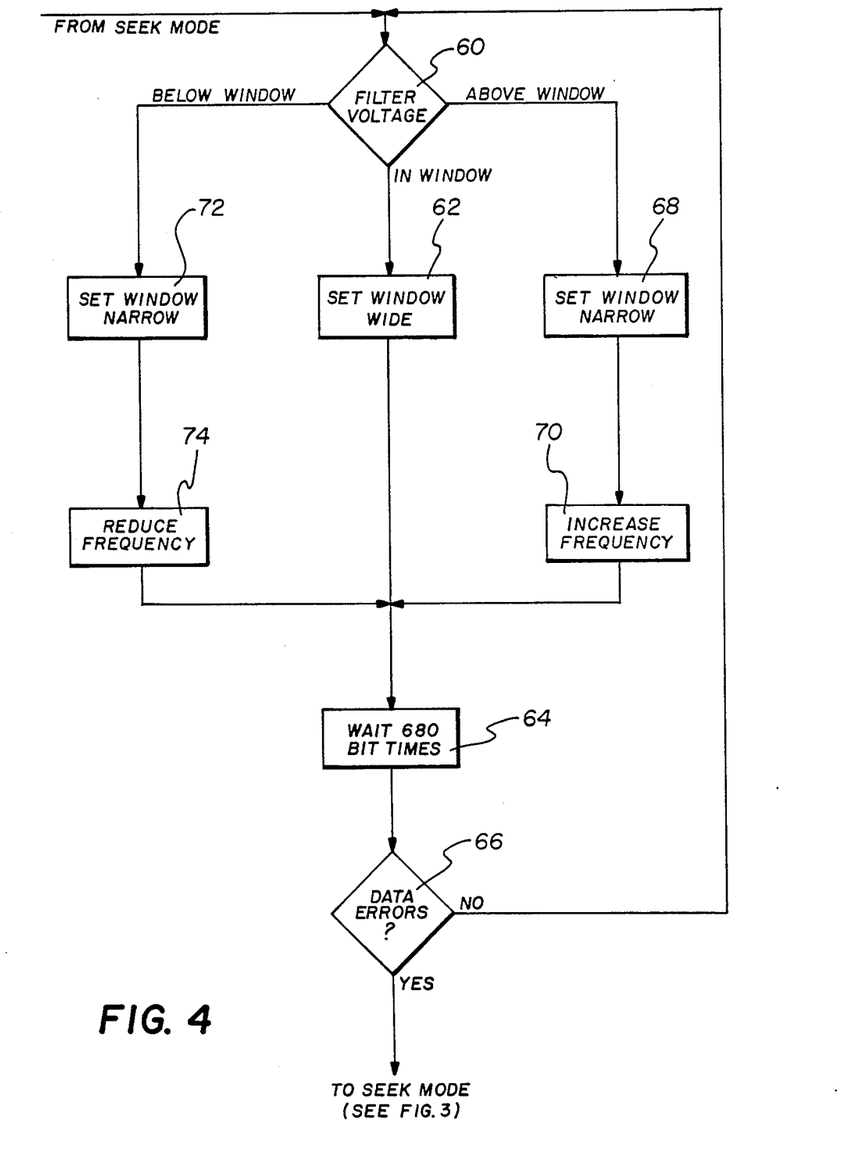

Referring now to FIGS. 3 and 4, operation of the circuit of FIG. 2 will be described in greater detail. In a magnetic tape reproduce system, during the normal operation of the bit synchronizer, the initial condition of the data channel 22 is without a data signal (because of either blank leader on the magnetic tape or because the magnetic tape is stopped). Decoder 36 shows data errors and the squelch signal is active. Those conditions cause the control circuit 40 to default to the do nothing state (See FIG. 3, diamond 44 and box 46). If the squelch is no longer on due to sufficient data signal amplitude being present at the bit synchronizer input, the bit synchronizer control circuit 40 begins to monitor data error detector 38. As soon as the data error detector 38 shows good data (40 consecutive good parity groups or 320 error free bits), the bit synchronizer enters the tracking mode of FIG. 4 (diamond 48). If good data is not found within the first 32 kilobits of the data signal (because the center frequency of VCO 32 is not correctly set) then the searching mode is entered (diamond 50).

In the search mode of the bit synchronizer of FIG. 2, the controlled voltage of VCO 32 is incremented every 256 bits of the incoming data signal until good data is detected by data error detector 38 (boxes 52 and 54). If good data has not been detected when the maximum control voltage applied to VCO 32 is reached, the control voltage and frequency are allowed to rollover to minimum and the voltage sweep is repeated.

If at any time during the search mode, the squelch signal from phase detector 28 becomes active (FIG. 3, diamond 56), then the sequence of operation returns to the "do nothing" condition (Box 46). As soon as good data is found during the search mode, the search (voltage sweep) is dicontinued and tracking mode is initiated (diamonds 48 and 58).

Referring to FIG. 4, the tracking mode of operation of the bit synchronizer of FIG. 2 will be described. The filtered phase detector output voltage from filter 30 is always being compared to a reference voltage by window comparators in control circuit 40. When the bit synchronizer of the present invention is in the tracking mode, the outputs of these comparators are allowed to control the bit synchronizer center frequency. Adjustments are only made if the data error detector 38 shows good data at the time of the correction to ensure that the filter voltage from filter 30 accurately represents the frequency error.

The size of the voltage window which is used in the comparison circuits changes. If the voltage is within the window but drifting out, it is allowed to drift farther before an adjustment is made to VCO 32 to compensate. Thus, in such case, the window voltages are set wide (diamond 60, box 62). If the voltage drifts above or below the window voltages (diamond 60), the window voltages are set narrow. The voltage error is then required to come quite close to the optimum center value before it is detected as within the window and corrections are stopped. Thus, if the voltage is above the window voltage, the window is set narrow (box 68) and the center frequency of VCO 32 is increased (box 70). If the error voltage is below the window voltage, then the window voltages are set narrow (box 72), and the center frequency of VCO 32 is reduced (box 74).

This hysteresis allows tracking until the frequency produced by VCO 32 is correct, but prevents tracking until the error has reached a threshold (either up or down). This prevents hunting around the correct value and minimizes the disturbances to the bit synchronizer.

Tracking adjustments are only made at intervals of 680 bits (FIG. 4, box 64) to insure that the filter voltage from filter 30 has settled to its new value after the last adjustment of the center frequency of VCO 32.

If at any time good data disappears and data errors are detected by data error detector 38, the control circuit 40 reverts the bit synchronizer to the seek mode (FIG. 3) and no further tracking adjustments are made (FIG. 4, diamond 66).

Figure 5:
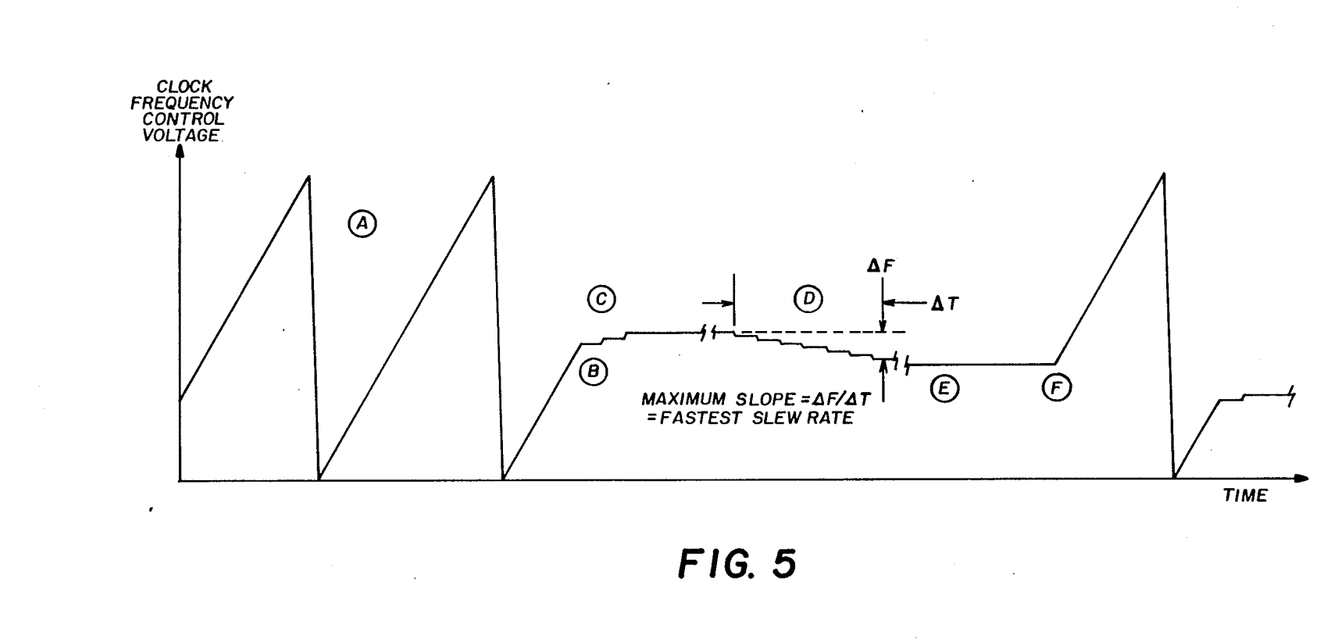
FIG. 5 is a diagram useful in explaining the operation of the present invention.

Referring now to FIG. 5, there is shown a diagram of clock frequency control voltage versus time which will be used to illustrate the operation of the bit synchronizer of FIG. 2 as operated in the seek and tracking modes of FIGS. 3 and 4. As shown in FIG. 5, during period A the bit synchronizer is in a seek mode and data error detector 38 has detected a data error in the incoming encoded data. In the absence of good data, control 40 sweeps the control voltage applies to VCO 32 continuously from low to high and then continues to repeat this sweep.

During period B, data error detector 38 has detected good input data to the bit synchronizer so that as the control voltage applied to VCO 32 by control circuit 40 approaches the correct data frequency, phase detector 28 pulls the VCO to phase lock even as the control voltage continues to sweep. As soon as detector 38 detects no data error the control voltage sweep stops. Each correct data frame detected enables the tracking circuitry to move the center frequency of VCO 32 one step closer to the optium center frequency value (minimum loop stress).

During period C, the tracking operation continues until loop stress is within the allowed range. No further tracking occurs unless drifts or data rate changes causes the voltage from filter 30 to move out of the allowed range.

During period D, the maxium rate of change in data frequency that can be allowed is a function of the slew rate of the tracking circuit.

During period E, detection of data errors for a period of time causes the control voltage applied to VCO 32 to be frozen at its current value. This permist dropouts and short gaps in recording without waiting for a sweep before relocking.

During period F, after a predetermined number of clock cycles have passed without good data being detected, control circuit 40 will switch to the seek mode and again begin sweeping the voltage of VCO 32 to look for a correct data rate.

Figure 6:
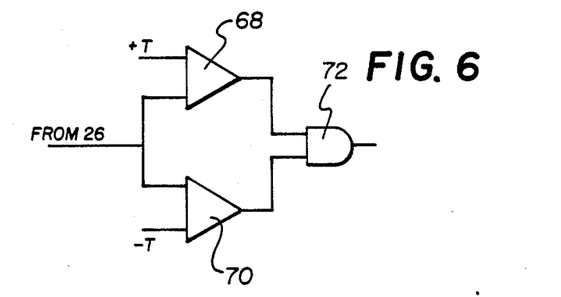
FIG. 6 is a schematic diagram of a squelch circuit.
Figure 7:
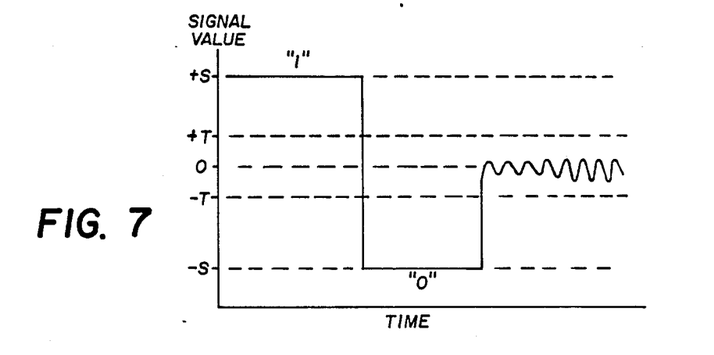
FIG. 7 is a diagram useful in explaining operation of the circuit of FIG. 6.

FIG. 6 shows a schematic diagram of a squelch circuit to be use in the phase detector circuit 28 of FIG. 2. As shown, the signal from zero crossing detector 26 is applied to operational amplifiers 68 and 70. When a data signal is present, it has a value of either plus S representing a digital (1) or a value of minus S representing a digital value of (0) (See FIG. 7).

Amplifier 68 has a plus T voltage applied to its other terminal and amplifier 70 has a minus T voltage applied to its other terminal. Voltages plus T and minus T are threshold voltage so that when the incoming data signal from detector 26 is greater than plus T, a digital (1) is detected and when the data signal is less than minus T a digital (0) is detected. In either case AND gate 72 has a low output. However, when the data signal is the result of a blank section of magnetic tape or a dropout, the signal is in a range between plus T and minus T. In such case, the output from AND gate 72 is high, representing a squelch signal. This signal is used by control circuit 40 to inhibit operation of the bit sychronizer during the dropout period.

Figure 8:
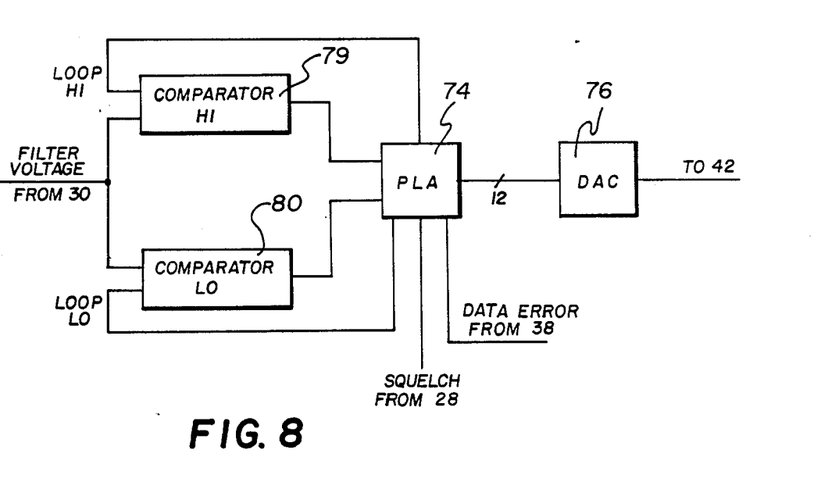
FIG. 8 is a schematic diagram of the control circuit of FIG. 2.
Figure 9:
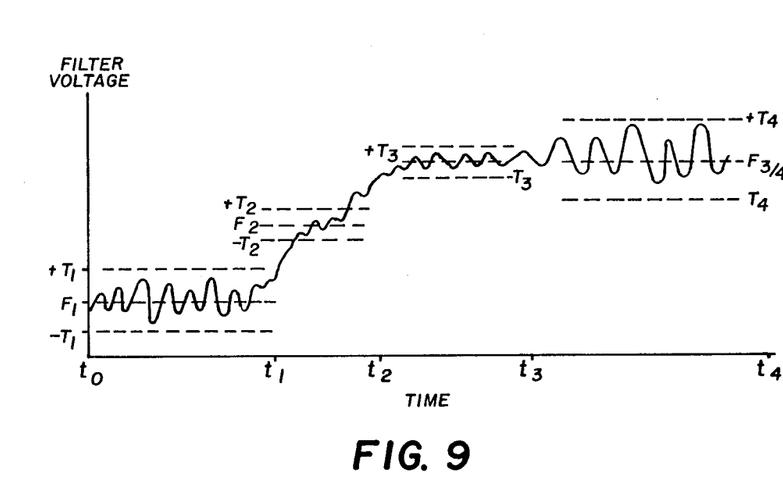
FIG. 9 is a diagram useful in explaining operation of the circuit of FIG. 8.

Referring now to FIGS. 8 and 9, the operation and structure of control circuit 40 will be described in greater detail. As shown in FIG. 8, control circuit 40 includes a logic circuit such as programmable logic array (PLA) 74 (or a microprocessor—not shown), digital-to-analog converter 76, comparator high circuit 78 and comparator low circuit 80. PLA 74 receives the squelch signal from phase detector 28, the data error signal from data error detector 38 and filter voltage comparison signals from comparators 78 and 80 to effect operation of the bit synchronizer of FIG. 2 in either the seek or tracking mode. PLA 74 provides a digital output to converter 72 to control the center frequency circuit 42 of VCO 32. Comparator 78 receives a filter voltage signal from filter 30, as well as a "loop high" signal, which establishes the upper limit of the tracking window during the tracking mode. Comparator 80 also receives the filter voltage from filter 30 and a "loop low" voltage which establishes the lower limit of the window during the tracking mode. As described above with respect to FIG. 4, during the tracking mode if the filter voltage is within the window, i.e. within the limits of the loop high and loop low voltages, then the window is set wide and the VCO is allowed to track within a wide limit. However, if the filter voltage goes outside of the wide window limits, then the limit voltages of loop high and loop low are set narrow and the tracking mode continues until the loop stress is within the allowed narrow range. At this point the window is set wider again.

This is shown in greater detail with respect to FIG. 9. As shown, during the period from $t_0$ to $t_1$, the filter voltage is allowed to vary between the wide limits of plus $T_1$ and minus $T_1$ without changing the center frequency $F_1$ of VCO 42. During time $t_1$ to $t_2$, the filter voltage has drifted above the window limit plus $T_1$ indicating a probable change in data rate of the incoming data. In such case, the window of comparators 78 and 80 is set narrow (plus $T_2$ and minus $T_2$) with a new center frequency $F_2$ being set. During period $t_2$ and $t_3$, the filter voltage continues to increase and exceeds the upper window plus $T_2$, so that control circuit 40 continues to increase the center frequency to $F_3$ and sets the window limits plus $T_3$ and minus $T_3$ within narrow limits. During this period the voltage stabilizes so that during period $t_3$ to $t_4$, control circuit 40 sets the loop stress with wide window limits of plus $T_4$ and minus $T_4$. Thus, the filter voltage is allowed to vary around the value $F_4$ (representing the center frequency) without control circuit 40 effecting further changes in the center frequency.

The invention has been described in detail with particular reference to perticular embodiments thereof, but it will be understood that variations and modifications can be effected within the spirit and scope of the invention.

What is claimed is:

1. A bit synchronizer comprising:
   a phase locked loop circuit including a phase detector having an input for receiving an encoded data signal, a filter coupled to said phase detector and a voltage controlled oscillator (VCO) which is coupled to said filter and which produces a clock signal coupled to the input of said phase detector; wherein said phase detector compares the phase of zero crossings of said encoded data signal with said clock signal produced by said VCO to produce a phase error signal which is filtered by said filter;

and wherein said filtered voltage is applied to said VCO to effect phase lock of said clock signal with said data signal;

data decoder means, coupled to said phase lock loop circuit, for decoding said encoded data signal as a function of said phase locked clock signal, and data error detector means, coupled to said data decoder menas, for producing a data error signal indicating absence of phase lock with said data signal when said decoder means produces decoded data having a preselected number of errors; and control means for controlling said phase locked loop circuit either (1) in a seek mode, when a data error signal is produced, to sweep said VCO through a predetermined range of frequencies until no data error signal is produced by said data error detector means; or (2) in a tracking mode, when no data error signal is produced by said data error detector means.

2. The bit synchronizer of claim 1 wherein said phase locked loop circuit includes a squelch circuit, associated with said phase detector, for receiving said data signal and for producing a squelch signal when said data signal is outside a threshold range and wherein said control means freezes said VCO clock signal at its current value during production of said squelch signal by said squelch circuit means.

3. The bit synchronizer of claim 1 wherein said control means includes comparator means for comparing said filter voltage to preset window limit values and wherein said control means (1) sets said limit values wide during normal tracking mode of said bit synchronizer; and (2) sets said limit values narrow, when said filter voltage is above or below said limit values.

* * * * *